US009517960B2

(12) United States Patent
Ward et al.

(10) Patent No.: US 9,517,960 B2
(45) Date of Patent: Dec. 13, 2016

(54) PROCESS OF OPERATING A GLASS MELTING OVEN

(75) Inventors: John Ward, Cardiff (GB); Neil Fricker, Solihull (GB); Richard Stanley Pont, Pathhead (GB); Thierry Ferlin, Tinqueux (FR); Stéphane Maurel, Paris (FR)

(73) Assignee: GDF SUEZ, Paris (FR)

( * ) Notice: Subject to any disclaimer, the term of this patent is extended or adjusted under 35 U.S.C. 154(b) by 0 days.

(21) Appl. No.: 13/584,231

(22) Filed: Aug. 13, 2012

(65) Prior Publication Data
US 2013/0011805 A1 Jan. 10, 2013

Related U.S. Application Data

(62) Division of application No. 12/514,318, filed as application No. PCT/FR2007/052518 on Dec. 14, 2007, now abandoned.

(30) Foreign Application Priority Data

Dec. 15, 2006 (FR) ..................................... 06 55571

(51) Int. Cl.
*C03B 3/00* (2006.01)
*C03B 5/235* (2006.01)
(Continued)

(52) U.S. Cl.
CPC ................ *C03B 5/235* (2013.01); *F23C 5/08* (2013.01); *F23C 6/047* (2013.01); *Y02P 40/57* (2015.11); *Y02P 40/58* (2015.11)

(58) Field of Classification Search
CPC ........... Y02P 40/55; Y02P 40/57; Y02P 40/58; F23C 5/08; F23C 6/042–6/047; C03B 5/235; C03B 5/2353; C03B 5/237; C03B 5/435
(Continued)

(56) References Cited

U.S. PATENT DOCUMENTS 4,496,306 A 1/1985 Okigami et al.
5,893,940 A * 4/1999 Tsai .............................. 65/29.19
(Continued)

FOREIGN PATENT DOCUMENTS

JP 5-180409 A 7/1993
JP 05180409 A * 7/1993 .............. F23C 11/00
(Continued)

OTHER PUBLICATIONS

JP 05180409 (Machine Translation) [online], [retrieved in Feb. 2012], retrieved from USPTO Translation Services.*
(Continued)

*Primary Examiner* — Michael H Wilson
*Assistant Examiner* — Yana B Krinker
(74) *Attorney, Agent, or Firm* — Leydig, Voit & Mayer

(57) ABSTRACT

A combustion method for melting glass in which two fuels of the same nature or different natures are fed into a fusion furnace at two locations remote from each other for distributing the fuel to reduce NOx emissions. The combustion air is supplied at only one of the locations. In a method for operating a glass melting furnace, the fuel injection is distributed to reduce NOx emissions. The furnace includes a melting vessel for receiving the glass to be melted and containing a bath of molten glass, walls defining the furnace, a hot combustion air inlet, a hot smoke outlet, at least one burner for injecting a first fuel, and at least one injector for injecting a second fuel. The injector has an adjustable flow complementary relative to the flow to the burner so that up to 100% of the totality of the first and second fuels used may be injected.

7 Claims, 7 Drawing Sheets

(51) Int. Cl.
*F23C 5/08* (2006.01)
*F23C 6/04* (2006.01)

(58) Field of Classification Search
USPC .......................................... 65/335, 336, 347
See application file for complete search history.

(56) References Cited

U.S. PATENT DOCUMENTS

| | | | |
|---|---|---|---|
| 6,047,565 A * | 4/2000 | Moreau ........................ | 65/32.1 |
| 2004/0079113 A1 | 4/2004 | Hegewald et al. | |
| 2007/0018011 A1* | 1/2007 | Giang et al. .................. | 239/13 |

FOREIGN PATENT DOCUMENTS

| | | | | |
|---|---|---|---|---|
| JP | 8-208240 A | | 8/1996 | |
| JP | 08208240 | * | 8/1996 | ............. F23D 14/66 |
| JP | 08208240 A | * | 8/1996 | ............... C03B 5/04 |
| WO | WO 2004101453 | * | 11/2004 | ............... C03B 7/06 |

OTHER PUBLICATIONS

JP 08208240 (Human Translation), [Feb. 2012], retrieved from FLS, Inc.*

* cited by examiner

PROCESS OF OPERATING A GLASS MELTING OVEN

FIELD OF THE INVENTION

The present invention relates to a combustion process for melting glass, as well as mainly to a glass melting furnace for implementation of this process, but the invention can also be applied to other types of high temperature furnaces.

BACKGROUND

Most types of glass, and in particular plate glass and container glass, are manufactured by melting of raw materials in large melting furnaces producing a few tens to a few hundred metric tons of glass per day and per unit. The fuel used in such furnaces is generally natural gas or fuel oil, although other fuels can also be used. Certain furnaces also use electricity to increase production (electric boosting). High temperature furnaces (typically 1,500° C., but sometimes higher) are necessary for the melting. Optimal furnace temperature conditions are obtained by pre-heating the combustion air (typically up to 1,000° C., but sometimes higher). The heat required for pre-heating the combustion air is transmitted by the waste gases, which is generally effected by using reversible regenerators. This approach enables one to obtain a high degree of thermal efficiency combined with high melting rates. Several types of melting furnaces exist, including:

Cross-fired furnaces: in these furnaces, which have a melting surface area generally greater than 70 m$^e$ and which operate with a reversal of the direction of the flame approximately every 20-30 min, the heat contained in the waste gases is recovered in regenerators made up of stacks of refractory bricks. The cold combustion air is pre-heated during its passage through the regenerators (rising air), while the hot waste gases leaving the furnace are used to re-heat other regenerators (descending waste gases). These furnaces, with an output sometimes greater than 600 t/day and which are used for manufacturing plate glass and container glass, are great energy consumers. The diagram of cross-fired furnace operation is presented in FIG. 1.

End-fired furnaces: in these furnaces, the flame (sometimes called a horseshoe flame) describes a loop. These furnaces operate with recovery of the heat of the waste gases by stacks forming regenerators which deliver it to the combustion air. The diagram of the operation of this type of furnace is presented in FIG. 2.

The fuel is injected into the furnace into or near the air stream leaving the regenerator. The burners are designed to produce high temperature flames with good radiative qualities so as to obtain an efficient heat transfer. A certain number of options exist for producing the comburant/fuel mixture. The names of these techniques show how the fuel is introduced. The most frequently encountered configurations are the following:

"Under port": under the air stream,
"Over port": above the air stream,
"Side port": beside the air stream,
"Through port": through the air stream.

The choice among these different injection methods is made so as to obtain a suitable result for the configuration of the air streams and of the type of melting furnace used, and as a function of constraints connected with fuel supply (example: available gas pressure for a furnace supplied with natural gas) or with the nature of the fuel.

Although such combustion methods are very efficient in terms of furnace operation, they induce adverse effects such as the production of very high levels of nitrogen oxides (subsequently called: NOx), one of the most regulated air pollutants. In the majority of industrialized countries, limits (in terms of concentration and flow rate) are imposed on large capacity glass making furnaces in order to reduce NOx emissions. Furthermore, regulation is becoming more drastic each year.

In high temperature furnaces as in glass melting furnaces, the main avenue of NOx formation is the "thermal" avenue in which the NOx are produced in zones of the furnace where flame temperatures are greater than 1,600° C. Beyond this threshold, the formation of NOx increases exponentially with the flame temperature. Unfortunately, the combustion techniques generally used in melting furnaces for creating very radiative flames such as those mentioned in the preceding induce high flame temperatures (with maxima greater than 2,000° C.) and have the consequence of generating NOx emissions much higher than those accepted in numerous countries of the world.

Furthermore, one of the consequences of conventional combustion methods is that there is little heat released by combustion in the major part of the volume of the furnace, since in effect the combustion products surrounding the flame gradually cool in giving up their heat to the glass bath.

Over time, the waste gases become less efficient in transferring heat to the glass bath by radiation. The transfer of heat by radiation from the flame to the glass bath can be increased to a significant degree if a way is found to increase the temperature of the combustion products still present in the melting chamber.

Several techniques exist enabling reduction of regenerative melting furnace NOx emissions. Among these can be distinguished primary methods (in which reduction occurs during combustion), secondary methods (in which reduction occurs by treatment of the combustion products at the furnace outlet) and intermediate methods in which the treatment occurs at the location of the outlet of the melting chamber to the regenerators (the Pilkington 3R process or re-burning).

The methods which can be used are the following:

Primary method—"Low-NOx" burners: There are several types of "low NOx" burners on the market, that is to say burners which enable reducing the NOx emissions even when used alone. However, their performances do not always enable obtaining the necessary reduction levels for compliance with European regulations or those in force in other countries around the world. More particularly, the following types of burners are encountered:

Double impulse burners—These burners produce a low gas speed at the root of the flame so as to reduce the temperature of the flame in the zone where the majority of the NOx is generated. The burners also increase the luminosity of the flame, which promotes a lowering of the temperature of the flame front by increasing the radiative transfer of heat to the glass bath.

Injection of enveloping gas or "Shrouded Gas Injection"—With this technique, gaseous fuel is injected at low speed above the "underport" burners in order to block the comburant flows and to delay mixing of the gas at high speed coming from the "underport" burners with the air streams, thus reducing temperatures at the root of the flame.

Ultra-low speed injection of the gas—Injections of fuel gas at very low speeds (less than 30 m/s) are used with special burners cooled by water circulation in order to minimize the local temperature of the flame and to increase its luminosity. The efficiency of this type of burner in terms of NOx reduction depends greatly on the design of the furnace.

Primary method—Staging: This technique uses conventional burners for injection of the fuel and reduction of the flow of combustion air through the air stream in order to create conditions of excess fuel and to introduce the rest of the comburant in another location of the furnace in order to complete oxidation of the fuel. This method, which can drastically reduce NOx emissions, is nevertheless difficult to implement and expensive to use since it requires pure oxygen or ducts for introducing air at temperatures higher than 1,000° C. in order to be thermally efficient (staging of the comburant in cold air would induce a reduction of energy efficiency). Examples of this staging technique are:

Air staging: Diverting the hot combustion air coming from the regenerators by using an ejector towards the combustion chamber in the direction of the waste gases so as to produce complete combustion. This method requires the use of heat-insulated ducts and cold air for directing the ejector, hence a loss of thermal efficiency. This technique has only been used on end-fired furnaces, and mainly in Germany.

Oxygen-enriched air staging or OEAS (for Oxygen Enriched Air Staging): The combustion air entering the air stream is introduced with an insufficient flow for complete combustion in order to create sub-stoichiometric conditions, and pure oxygen or oxygen enriched air is injected at the rear of the furnace towards the flow of waste gases so as to complete combustion in the recirculation zone of the furnace. The OEAS injectors are generally installed in under-port position separately from the burners. This technique has been applied successfully in end-fired furnaces and in cross-fired furnaces, and mainly in the United States.

Among the various staging technologies, the patent WO 97/36134 discloses a device with line burners. This device makes it possible to stage the fuel within the air stream. The fuel supplied to the furnace is divided in two, and a portion is injected upstream of the burner directly into the hot combustion air. This methodology does not use an injection of fuel directly into the combustion chamber as in the present invention. The technique uses an injection of fuel but always coupled with an injection of air.

Primary Method—Rich Operating Conditions:

This technique reduces the NOx emissions by injecting additional fuel into the combustion chamber so as to create a "reducing atmosphere" in the combustion chamber. The reducing atmosphere converts the NOx formed in the flame into nitrogen and oxygen. In this technique, the NOx produced in the high temperature flame front are reduced in a second step.

In effect, as shown, for example, by the document JP-A-08208240, additional fuel introduced by injectors situated on the wall supporting the burner, on the side wall or facing the burner, is added to the original fuel supplying the burner or burners. However, according to this method, while making possible considerable NOx reductions in the combustion chamber, it is necessary to provide additional combustion air after the exit from the combustion chamber. Not only does this method require additional consumption of fuel, but the additional fuel is not burned in the combustion chamber and therefore does not participate in the melting of the glass.

This process uses an over-consumption of fuel in order to reduce the NOx, and its application can lead to an increase of the temperatures in the regenerators and in time to degradation of the regenerators.

Secondary method—Treatment of the waste gases: A major portion of the NOx is treated at the outlet of the furnace by the use of chemical reduction processes. Such processes require the use of reducing agents such as ammonia or hydrocarbon-containing combustion residues with or without the presence of catalysts. Although capable of achieving the NOx level reductions set by regulations, these processes are very expensive to install and operate, and in the case of processes based on hydrocarbons such as the 3R process or system explained hereafter, a 5-15% increase of the fuel consumption is observed. Examples of this technique are given below:

3R process (Reaction and Reduction in Regenerators; patented process of the Pilkington company)—In this technique, the gas is injected at the chamber roof so as to consume any excess air and to produce reducing conditions in the regenerators situated at the outlet of the furnace, resulting in the conversion of the NOx into nitrogen and oxygen. Since an excess of gas must be used, it is consumed in the lower part of the regenerators where the air is infiltrated or injected. The additional heat generated is often recovered by boilers. In order to minimize the quantity of gas necessary for the 3R system, it is common to operate the furnace with the lowest possible excess air. This technology enables achieving the NOx reduction levels imposed by the current regulations, and even to exceed them. Generally, 5-15% of the total fuel consumption of the furnace is necessary for implementation of the 3R process. The reducing atmosphere in the regenerators is often the cause of problems with the refractory material composing them.

Selective catalytic reduction or SCR (Selective Catalytic Reduction)—This method uses a platinum catalyst for reacting the NOx with ammonia or urea so as to reduce the NOx into $N_2$ and water. The process has to take place at a specific temperature and requires precise control of the ammonia in order to avoid accidental pollution-generating discharges. Since this reaction occurs on the surface, large surface areas of catalyst are necessary, involving relatively large installations. The chemical process is relatively complex and demanding in terms of control and maintenance. Very high NOx reduction levels are attained; however, the contamination of the catalysts by the waste gases loaded with particles coming from the glass melting furnace poses problems of clogging and corrosion. After a certain length of time, the catalysts have to be replaced at considerable cost.

SUMMARY OF THE INVENTION

The aim of the invention is thus to propose a process and means making it possible to remedy all of the above disadvantages.

More particularly, the invention must make it possible to reduce the NOx emissions while increasing the temperatures of the surrounding waste gases within the furnace (the NOx emissions produced in these zones are very low). Moreover, the invention must make it possible to maintain or even increase the transfer of heat to the glass bath as well as the yield of the furnace.

The aim of the invention is attained with a combustion process for melting glass according to which two fuels, of the same nature or of different natures, are introduced into a melting chamber at two locations a distance away from one another in order to distribute the fuel in the melting chamber for the purpose of limiting the NOx emissions, with combustion air being supplied at only one of the two locations.

The aim of the invention is also attained with a glass melting furnace which has a tank for receiving the glass to be melted and holding the bath of melted glass, with, above the glass, walls respectively forming a front wall, a rear wall, side walls and a roof and constituting a melting chamber, also called a combustion chamber, as well as at least one intake for hot combustion air (the combustion air intake also being called an "air stream"), for example, at the outlet of a regenerator, at least one outlet for hot waste gases, and at least one burner for introducing a first fuel into the melting chamber.

According to the invention, the melting furnace moreover has at least one injector for injecting a second fuel into a zone of the melting chamber which is a distance away from the burner and between the roof and a horizontal plane situated at a level higher than or equal to a horizontal plane passing through a lower edge of the intake for hot combustion air, the injector being adjustable in terms of flow in a complementary manner with respect to the burner so that it is possible to inject up to 100% of the total of the first and second fuels used by the injector and the burner, regardless of whether the first and second fuels are of the same nature or of different natures. Advantageously, said horizontal plane delimiting the zone of injection of the second fuel is situated between the roof and a horizontal plane whose distance from the glass bath is greater than or equal to the minimum height of the air stream in the melting chamber.

In no case is the second fuel injected directly into the hot combustion air.

According to the language chosen for the preceding paragraphs, in the whole of the present text, the term "burner" exclusively designates a means for injecting and burning the first fuel, while the term "injector" exclusively designates a means for injecting and burning the second fuel.

Traditionally, and particularly when thinking of existing furnaces which can be modified in order to implement the invention in them, the burner could also be called a "burner," and the injector then would have to be called an "auxiliary burner." However, such language would weigh down the present text and would be a source of errors.

Likewise, in the description of the furnace according to the invention and in the description of other furnaces whose burners are situated on a given wall or which have only one burner, the front wall is that which bears the burner or burners, the rear wall is the oppolocation wall, and the side walls are the other two walls. And in the case of a furnace with a non-rectangular base, the present definition applies in a similar manner to the corresponding wall sections.

Furthermore, any indication of the number of burners or injectors in a melting furnace according to the invention is given purely as an example and in no way presumes a particular embodiment of such a furnace. In effect, the principle of the present invention is just as valid when a melting furnace according to the invention has a single burner and a single injector as when it has several, and not necessarily an equal number of burners and injectors.

According to the present invention, the burners present on a traditional furnace are kept. They are supplemented by one or more injectors, making it possible to introduce into the melting chamber, in one or more zones a distance away from the burners, either another fuel or a fraction of the same fuel as that introduced by the burners. This injection is sometimes called auxiliary—as opposed to an additional injection, for example, in afterburning—because its purpose is not to increase the fuel quantity or flow rate but rather to better distribute or spread the quantity of fuel necessary for the quantity and type of glass to be melted and thus to obtain a better heat transfer towards the glass to be melted, while at the same time reducing the NOx emissions.

This arrangement of the invention, which is furthermore just as valid when the first and the second fuels are of the same nature as when they are of different natures, is moreover the basis for the so-called "complementary" method of adjusting the flow rate of the injectors indicated above.

In effect, the flow rate of the second fuel is varied as a function of the flow rate of the first fuel so that when the burner does not introduce all of the fuel necessary for melting the glass, the rest is introduced by one (or more) injector(s) arranged a distance away from the burner and if necessary a distance away from one another, in regions or zones of the furnace where the second fuel will mix initially with the re-circulated combustion products, that is to say coming from the burner or burners and therefore having a low oxygen content, before igniting in contact with the hot combustion air not consumed by the flame of the burner or burners.

Let us expressly note on this subject that in the melting furnaces according to the present invention, there is no secondary air intake for combustion of the second fuel, since there is no afterburning.

Generally, in order to obtain a reduction of the NOx emission, the burner operates in an excess of air, that is to say that the burner introduces less first fuel than the flow rate of combustion air would permit. This lowers the temperature of the flame of the burner with respect to temperatures that the flame would have under stoichiometric conditions, and thus reduces the NOx emission.

In the case of our invention, when the first fuel is burned, the combustion products fill the combustion chamber and are therefore present at the location or at all the locations where an injector is placed for introducing the second fuel. During the introduction of the second fuel, it is first diluted by the products of combustion of the first fuel and then ignites with the arrival of the combustion air not consumed by the combustion of the first fuel.

With regard to the "distant" arrangement of the injectors, the distance of the zones (for arrangement of the injectors) away from the burner or burners depends, for example, on the geometric data of the furnace and therefore on the time that it takes for the waste gases to arrive at the injector: the injector must be sufficiently far from the burner to allow the waste gases to arrive at the injector and to mix with the second fuel before the non-consumed combustion air from combustion of the first fuel arrives and ignites the second fuel.

The arrangement of one or more injectors with respect to the burner(s) of a glass melting furnace according to the present invention leads to a gradual combustion of the fuel introduced in these regions or zones, producing an increase of the temperature of the waste gases in these fuel rich zones, as well as to an increase of heat transfer to the glass bath.

The aim of the invention is also attained with a process for operating a glass melting furnace which has a melting tank for receiving the glass to be melted and holding the bath of melted glass, with, above the glass, walls forming a melting chamber, at least one intake for hot combustion air, at least one outlet for hot waste gases as well as at least one burner and at least one injector for respectively injecting a first fuel and a second fuel into the chamber.

According to this process, a first fuel and a second fuel, of the same nature or not, are injected into the furnace by the burner(s) and injector(s), the injector(s) being arranged on a different wall or on different walls from that on which the burner(s) is (are) positioned and being a distance away from the burner or burners, and the burner(s) and the injector(s) are adjusted in a complementary manner so that the total of the first and second fuels used by injector(s) (4) and burner(s) (1) corresponds for the most part to the total flow used normally on the furnace, regardless of whether the first and second fuels are of the same nature or of different natures.

The fraction of the fuel which is introduced as second fuel, or the quantity of a second fuel different from the first, is determined for each furnace, and can range up to the entire quantity of fuel.

With this technique, according to which a first fuel is introduced into the melting furnace with an excess of air with respect to the stoichiometric flow of combustion air, since the fuel fraction introduced by the injectors no longer supplies the burner, the portion of fuel burned with a high temperature flame front is reduced, thus generating less NOx emission by the thermal avenue.

The combustion air not used by the burner remains available for combustion of the second fuel introduced by the injector.

It is also likely that the fuel introduced in the zones of the furnace with high temperatures, but with a reduced oxygen content, will crack in order to produce soot, thus increasing the heat transfer from these zones to the glass bath.

The potential injection points can be situated on the side and rear walls of the furnace and on the wall forming the roof. In certain cases, the center of the roof which, in the case of the traditional rectangular shapes of glass melting furnaces, is a transverse line of symmetry or a longitudinal line of symmetry of the roof with respect to a reference direction given by the direction of the burner flame, can be particularly advantageous for injection of the second fuel, because by choosing this location it is possible to reduce by two the number of injectors necessary for execution of the invention.

The selection of the injection points, of the direction of the jets coming out of the injector and of the speed of these jets is essential for the success of this combustion technique. The most suitable positions as well as the geometry of the injectors have to be identified for each melting furnace.

The speed and the direction of introduction of the second fuel have an influence on the result obtained by implementation of the various arrangements of the invention. However, these two characteristics are determined during design of the device. An error in determination of the position of the injectors or of their geometry can not only compromise the efficiency of the combustion technique but can also lead to a lowering of the furnace yield as well as to an increase of the temperature of the refractory regenerators. In extreme cases, premature shutdown of the furnace can occur.

The most favorable locations for the injectors and the directions and speeds of fuel injection, but also clear indications as to the injector geometries which risk being counterproductive, are advantageously determined using models obtained by computations and tests. Such models are based on a combination of physical and mathematical modeling techniques and take into consideration the technical constraints imposed by the construction of each furnace. The adoption of the most favorable auxiliary combustion configuration suggested by the modeling results in NOx emissions much lower than those generated by combustion methods different from those of the invention, and without this being done at the cost of lowering the furnace yield. The auxiliary fuel ratio is adjusted to obtain a compromise between furnace efficiency and level of NOx emissions. By predicting the temperature within the chamber, the model makes it possible to adjust the auxiliary fuel ratio to avoid any hot spot as well as any cold spot on the internal surfaces of the furnace. Particular care should be taken to avoid:

condensation of alkaline materials on the roof or walls of the furnace (wear and tear of the refractory materials),
condensation of hydrocarbons on the internal walls of the furnace, as well as modification of the nature of the glass by addition of carbon to its composition.

This is made possible by the modeling which enables one to choose a sensible location.

Such models make it possible, for a cross-fired furnace, for example, to determine the injection position situated in the roof and in the center for a burner as being one of the most favorable for intended reduction of the NOx emissions, with an injected secondary fuel ratio that can vary as a function of the emission level limits that need to be achieved for this burner. A great advantage of symmetrical injection in the roof with respect to lateral injection is the use of the same injectors for the flame on the left and the flame on the right.

The number of burners to be equipped with an injector can vary as a function of the overall level of NOx reduction to be achieved for the furnace.

With regard to end-fired furnaces which have two ports at one end of the melting and refining chamber, and two sealed regenerators, each connecting respectively with a port, the auxiliary injections in the roof, like the injections on the walls, should preferably occur in a zone situated between the roof and a horizontal plane whose distance from the glass bath is greater than or equal to the minimum height of the air stream.

The injections should occur, symmetrically or not, on both sides of the furnace. Locating the injection point(s) optimally is done by use of a model, since end-fired furnaces can differ from one another, mainly because of the width/length ratio of the furnace.

Consequently, it is proposed to implement the auxiliary combustion technique developed here while adding to it the combustion technique already present on the furnace. This is done by adjusting the fuel flows between the injectors and the burner so as to produce a balance between NOx reduction, the nature of the glass, and suitable thermal efficiency for each installation under consideration.

An embodiment of a melting furnace according to the invention enabling one to obtain NOx reduction while maintaining or even increasing the heat transfers is described further on.

The approach of the invention also makes possible a gradual implementation of this novel combustion technique, thus reducing or eliminating the risks of production loss due to damage to the furnace. Finally, this approach allows the operator at any time to go back to his initial combustion configuration.

Although developed for use on regenerative glass melting furnaces, the auxiliary combustion technique of the invention can also be used on other types of glass melting furnace (for example, Unit-Melter furnaces or recuperator furnaces), as well as on furnaces other than glass melting furnaces.

Although it is anticipated that the fuel injected by auxiliary routes is natural gas for furnaces supplied with natural gas or fuel oil, the use of various fuels such as biogas, hydrogen, LPG and fuel oil is not excluded.

Thus, the present invention relates equally to the following characteristics considered alone or in any technically possible combination:

the injector or each injector is arranged in a zone situated between the roof and a horizontal plane whose distance from the glass bath is greater than or equal to the minimum height of the air stream;

the injector or each injector can be adjusted in terms of flow rate so that it is possible to inject up to 100% of the total of the fuel used by the injector(s) and the burner(s);

at least some of the injectors are arranged on the roof of the furnace;

at least some of the injectors are arranged on the side walls of the furnace;

at least some of the injectors are arranged on the rear wall of the furnace;

at least some of the injectors are arranged on the wall of the furnace on which the burner is situated;

the injectors are oriented at least approximately in a direction oppolocation from the main direction of the flames of the furnace burners;

the injectors are oriented at least approximately in the same direction as the flames of the furnace burners;

the injectors are oriented at least approximately in a direction perpendicular to the flames of the furnace burners;

the injectors are oriented at least approximately in a direction transverse to the flames of the furnace burners;

the first fuel and the second fuel are of the same nature;

the first fuel and the second fuel are of different natures.

The injectors can be equipped with a system of rotation (swirler) making it possible to control the shape of the flame independently of the flow rate of secondary fuel so that it is possible to inject up to 100% of the total of the fuel used by the injector(s) and the burner(s) without affecting the glass bath.

The injectors can be equipped with a device making it possible to adjust the impulse of the fuel (double impulse) independently of the flow rate of secondary fuel so that it is possible to inject up to 100% of the total of the fuel used by the injector(s) and the burner(s) without affecting the glass bath.

The injectors can have a non-circular shape or can have multi-jets in order to adjust the shape of the flame without affecting the glass bath.

In a modified melting furnace according to the invention, reduction of the nitrogen oxides contained in the combustion products is obtained by using the combination of the burners already present on the furnace along with auxiliary injections of fuel in the zones of re-circulation of the waste gases of said furnace. The injections are made according to one or more jets situated in optimal locations on the furnace which are defined by using a methodology based on digital simulation, which can be coupled or not with the representation of the flows by a mock-up of the furnace. The plane of the injections can be parallel, perpendicular or transverse to the surface of the glass bath. The invention can be applied in the domain of reduction of the nitrogen oxides by primary method in glass melting furnaces.

The invention makes it possible:

to reduce the NOx emissions, to reduce or eliminate the post-treatment costs, to improve the yield of the furnace, and to reduce the NOx emissions while improving the yield of the furnace.

Furthermore, the invention can be applied regardless of the fuel supplying the burner, can be applied with a fuel supplying the injectors which is of a different nature from that supplying the burners of the furnace, if necessary the type of injector being adapted to the chosen fuel, can be applied with a fuel supplying the injectors which is of the same nature as that supplying the burners of the furnace, with it then being possible for the type of injector to correspond to that of the burners with regard to their adaptation to the fuel, is implemented directly in the combustion chamber, also called the melting chamber, makes it possible to distribute the fuel between the main burners already equipping the furnace and injectors in such a way as to bring about reduction of the NOx emissions combined with a suitable yield for each particular furnace, can be used with under-port burners, side-port burners, through-port burners or with any other type of burner originally equipping the furnace, can use the injection, by the injectors, of a fraction of the fuel injected by the burners but can just as well use all of the fuel by the injectors.

The auxiliary injection is not implemented directly in the air stream, can be done from the roof, can be done from the walls situated to the front or rear of the furnace, can be done from the side walls, uses positions as well as angles and speeds of injections which are determined by a parametric study using modelings of the furnace that is intended to be transformed, can be done with the same fuel or with a different fuel from that injected by the burners, can be done with natural gas, can be done with LPG, can be done with fuel oil, can be done with coke-oven gas, can be done with blast furnace gas, can be done with reforming gas, can be done with biogas, can be done with hydrogen, can be done with any other fuel.

BRIEF DESCRIPTION OF DRAWING FIGURES

Other characteristics and advantages of the present invention will emerge from the description hereafter of an embodiment of a furnace according to the invention. This description is given with reference to the drawings in which.

DETAILED DESCRIPTION

Figure 1:
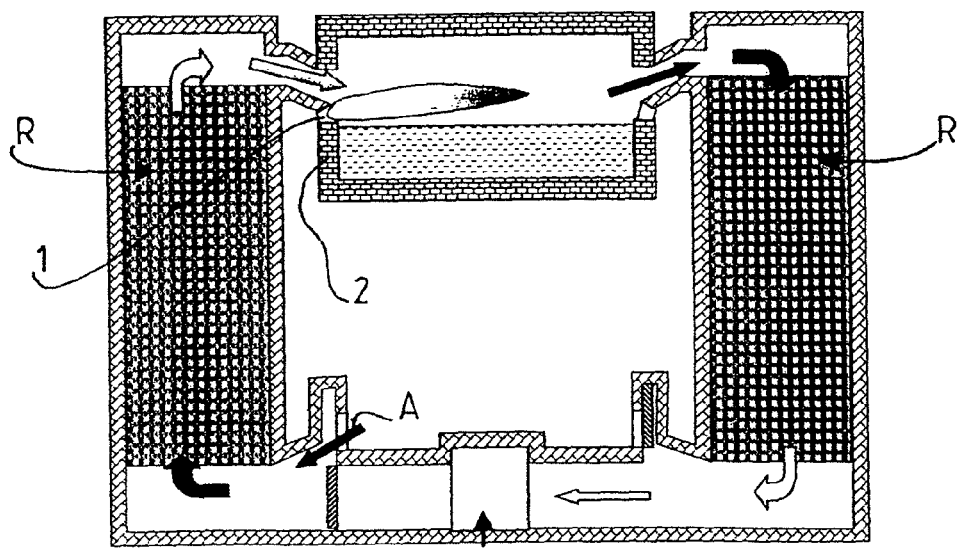
FIGS. 1 and 2 represent two types of melting furnaces used before the invention.
Figure 2:
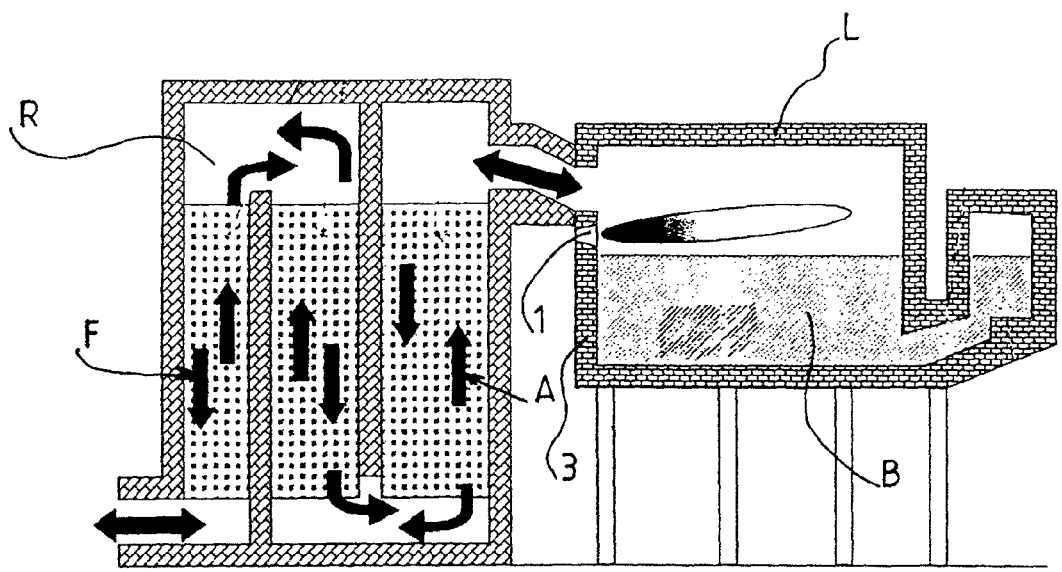

FIGS. 1 and 2 each very diagrammatically represent two types of glass melting furnaces that are traditionally used, namely a cross-fired regenerative furnace and an end-fired furnace. Both types of furnaces have a rectangular base bound by four walls, of which the two walls extending in the lengthwise direction of the furnace are in this case called the side walls and of which the other two walls are called the transverse walls. At the top, both furnaces are bounded by a roof.

In a cross-fired regenerative furnace (FIG. 1), burners 1 are arranged in side walls 2 and operate alternately on one side and then the other for approximately 20-30 min per side. Cold combustion air A is pre-heated in two heat recuperators R, namely in an alternating manner according to the rhythm of operation of the burners, in that one of the two recuperators which is near the burners in operation. The resulting waste gases F then re-heated in that one of the two recuperators R which is remote from the burners in operation.

In the end-fired glass melting furnace (FIG. 2), in which the length of the furnace does not greatly exceed its width, burners 1 are arranged in transverse wall 3. The range of the flame of each of burners 1 is such that, under the influence of the oppolocation transverse wall, the end of each of the flames describes a loop. The cold combustion air is pre-heated in a part of regenerator R with several chambers before being directed as hot combustion air AC towards the burners. The resulting waste gases are then directed towards the other regenerator in order to re-heat it.

In both furnaces, the flames are directed approximately parallel to the surface of glass bath B.

Figure 4:
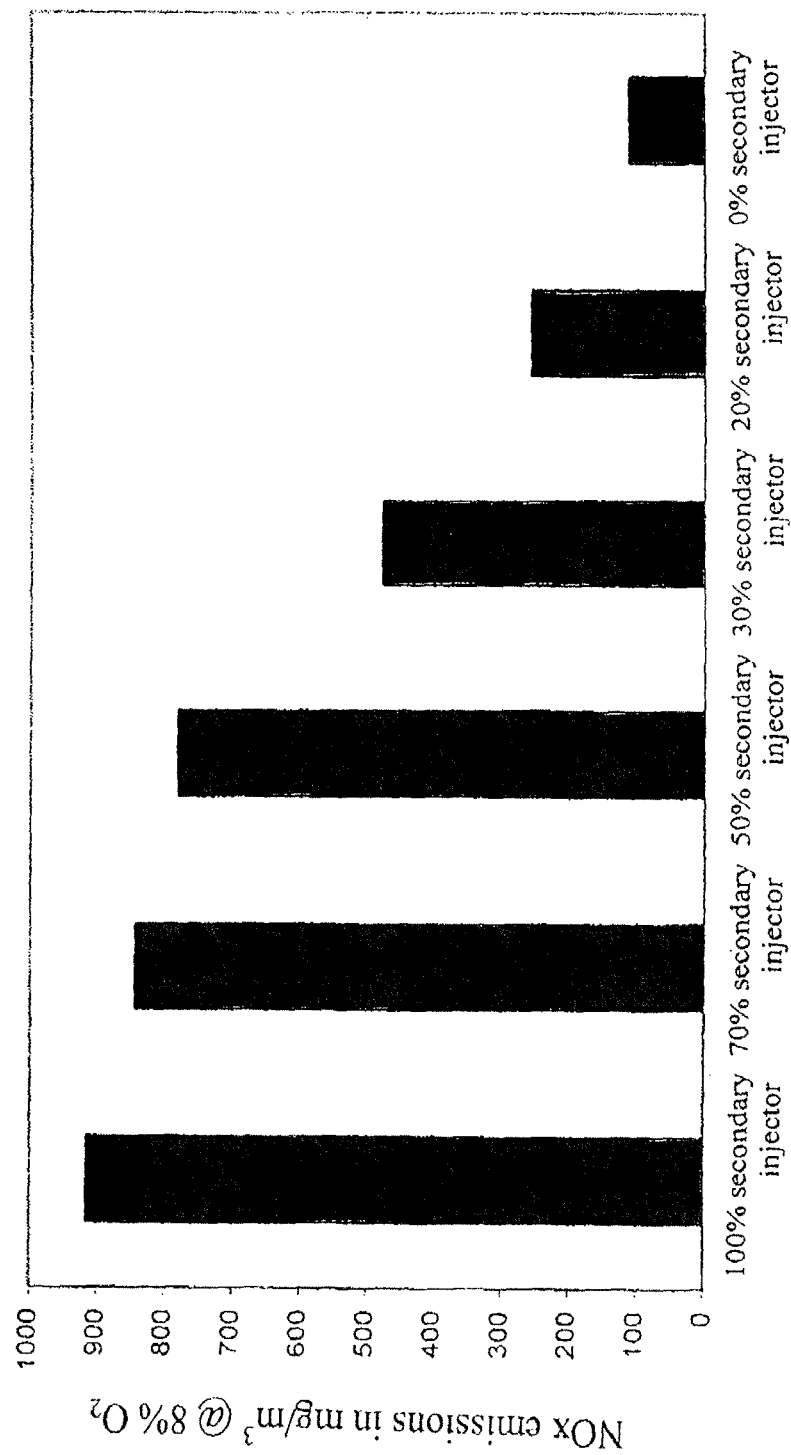
FIG. 4 represents, in a diagram, the NOx levels as a function of the distribution of power between the burners and the associated injectors.

FIG. 4 represents, in a diagram indicating the NOx level achieved as a function of the power distribution between burner 1 and injectors 4, the results obtained in a semi-industrial test furnace (or a test cell). It should be noted more particularly that the NOx emission level decreases with the increase of the portion of fuel injected through the secondary injectors.

Figure 5:
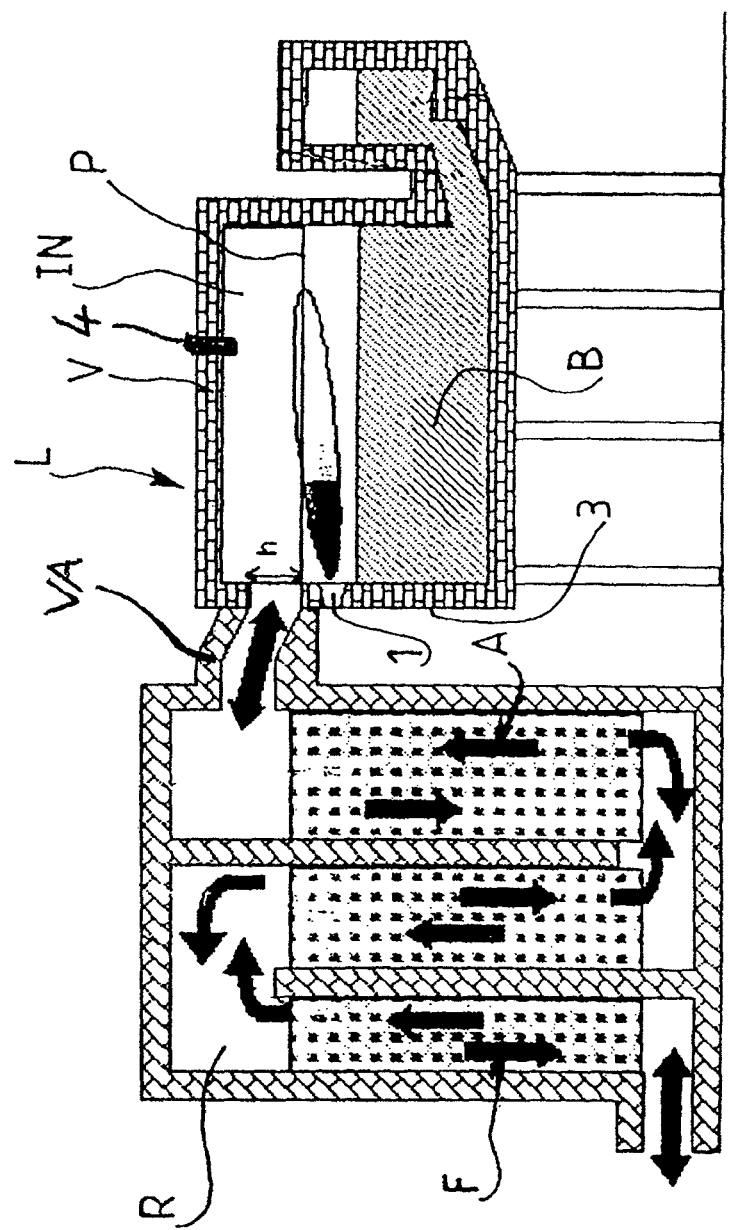
FIG. 5 represents a diagrammatic view of a furnace according to the invention in the form of a vertical section indicating an auxiliary injection zone example.

FIG. 5 once again represents the end-fired furnace of FIG. 2, but in this case with indication of zone IN in which, according to the invention: the secondary fuel injections must occur in a defined space above the flames, that is to say between roof V and horizontal plane P whose distance from glass bath B is greater than or equal to the minimum height of air stream VA, that is to say in a zone of the melting chamber which is a distance away from the burner and situated between the roof and horizontal plane P situated at a level higher than or equal to a horizontal plane passing through the lower edge of the hot combustion air inlet.

The auxiliary injections advantageously but not necessarily take place symmetrically on both sides of the furnace.

Figure 3:
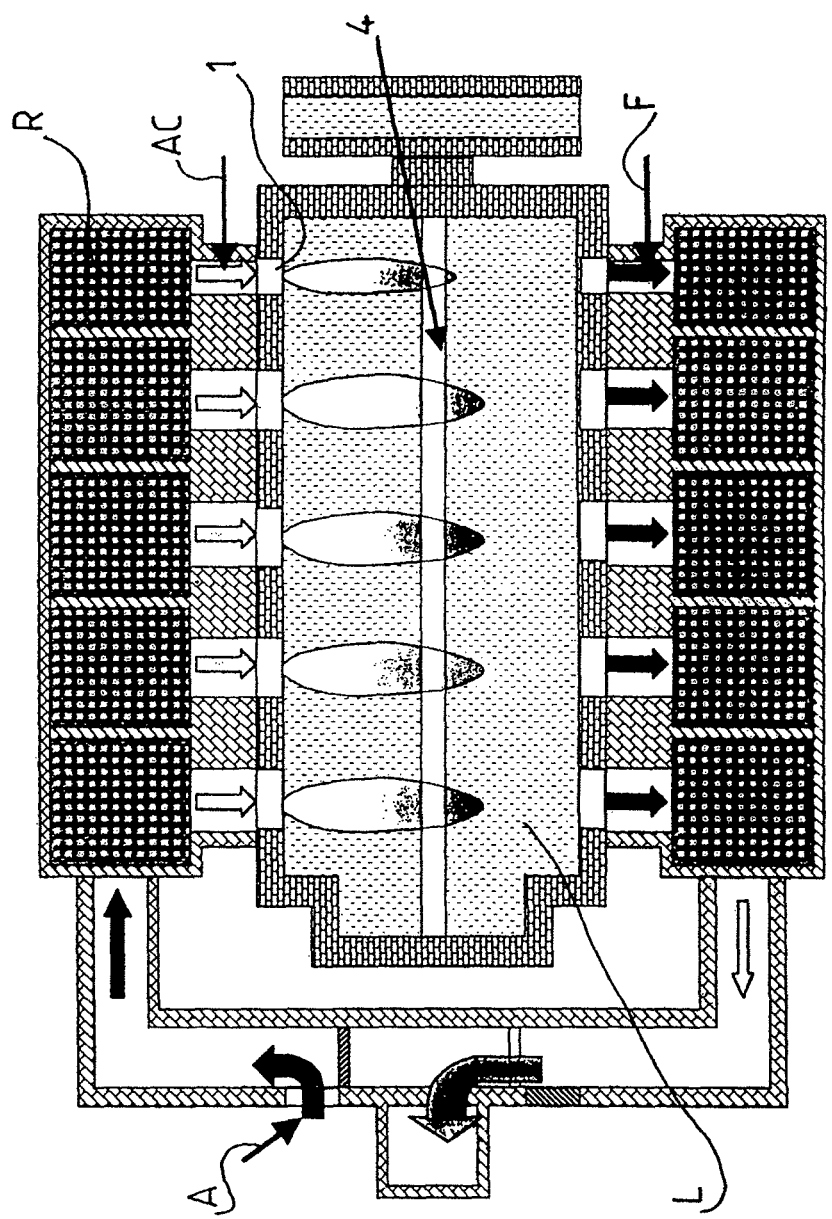
FIG. 3 represents a cross-fired melting furnace according to the invention in the form of a horizontal section indicating the zone of the auxiliary injections.

According to an embodiment which is particularly economical in terms of number of injectors 4, as diagrammatically represented in FIG. 3, the injectors are arranged in a zone corresponding at least approximately to a central zone with respect to the burners that are arranged in the side walls of the furnace and that operate in an alternating manner or simultaneously.

In this view, one also sees the introduction of cold combustion air A, its passage through heat recuperators R in order to be pre-heated before entering melting tank or chamber L, the exit of the hot waste gases from the melting chamber, and their passage through the heat recuperators before leaving the melting furnace. And an example of an injector arrangement is seen more particularly. Recall that the precise position of each of the injectors is determined by a combination of computations according to a model and tests with the specific furnace that is to be equipped with such injectors.

Tests have been done with such a furnace with a unit power of the under-port burners of 1.03 MW with an angle of injection to the burner of 10°, an air factor of 1.1, a pre-heated air temperature of 1,000° C. and a furnace temperature of 1,500° C. The results are represented in FIGS. 4, 6, 7 and 8.

Figure 6:
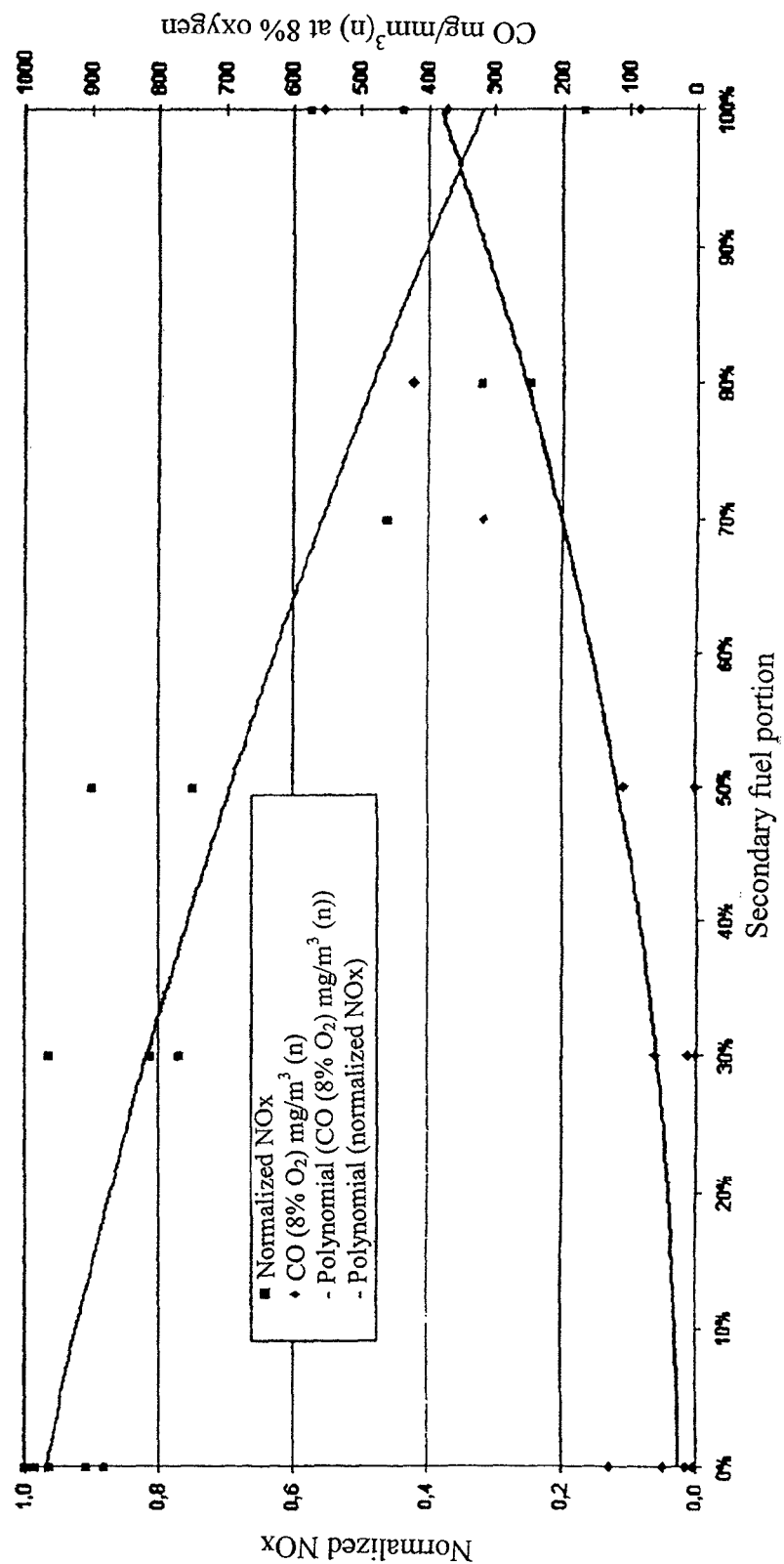
FIG. 6 represents, in a diagram, a comparison of the levels of NOx and CO obtained in a furnace with and without use of the invention.

FIG. 6 represents, in the form of a diagram, the levels of CO and NOx with 8% oxygen for different distributions of power between a burner and one or more allotted injectors, the injector or injectors being arranged in the roof of the furnace.

Figure 7:
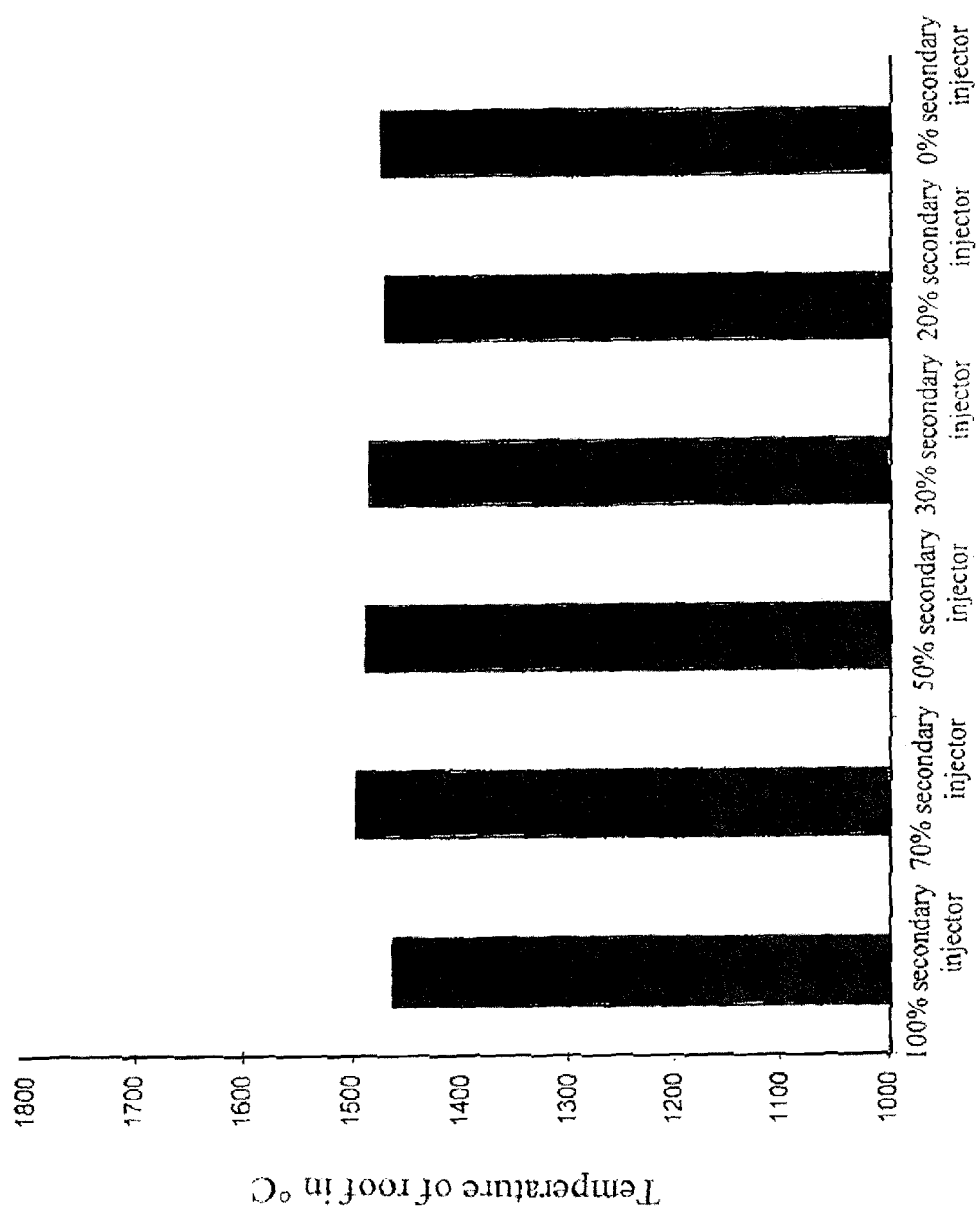
FIG. 7 represents, in a diagram, temperature levels obtained in a furnace with and without use of the invention.

FIG. 7 represents, in the form of a diagram, the temperature levels of the roof for different methods of operation of the furnace, namely in the case of a single burner and in the case of a burner with an injector that injects between 30 and 100% of the fuel. It is observed that the process does not bring about any overheating of the roof.

Figure 8:
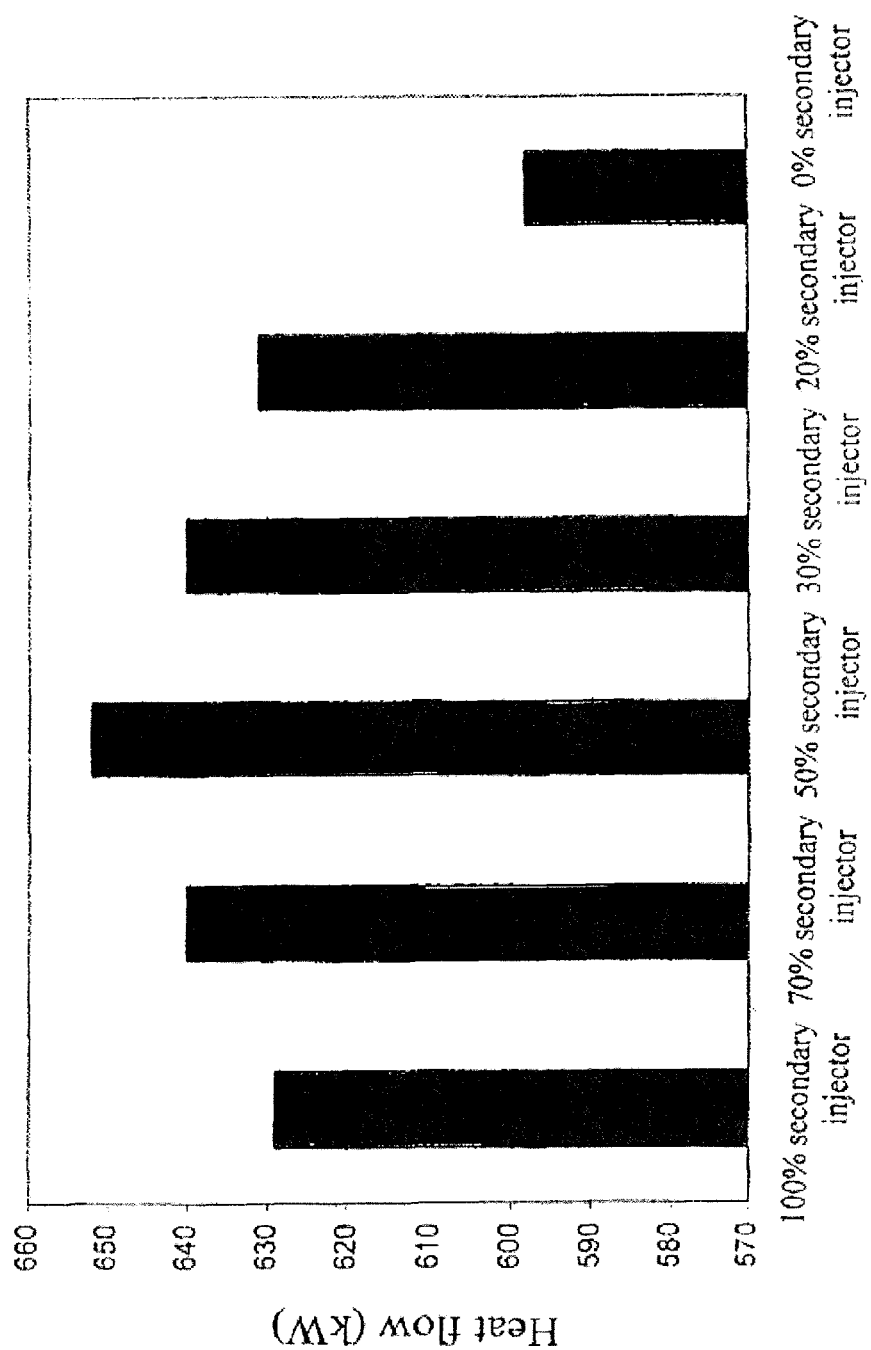
FIG. 8 represents, in a diagram, a comparison of heat transfers obtained with and without use of the invention.

FIG. 8 represents, in the form of a diagram, the heat flows transmitted to the load without and with secondary injection. In this example, the heat flow is highest in the case of secondary injections of between 30 and 80% of the fuel.

FIG. 6 represents, in the form of a diagram, the levels of NOx and CO of a furnace without and with auxiliary injection ranging up to 100% of the fuel. It is observed that the levels of NOx decrease when the auxiliary fuel portion increases. As for the CO levels, they gradually increase with the auxiliary fuel portion but in completely tolerable proportions.

A compromise therefore has to be reached between the NOx and CO levels and the yield. In the example presented, this compromise is reached with a fuel flow rate of between 50 and 70% of the total flow rate.

The invention claimed is:

1. A combustion process for melting glass in a glass melting furnace, which includes a melting chamber having side walls and a roof wall above the side walls, the process comprising:
   determining a total quantity of fuel necessary for melting a predetermined quantity of glass;
   supplying, at a first location, on a first of the side walls of the melting chamber, into the melting chamber, a first fuel quantity, constituting a part of the total quantity of fuel determined;
   supplying into the melting chamber, at a second location, located on at least one of (i) the roof wall and (ii) a second of the side walls of the melting chamber, different from the first of the side walls, and spaced from the first location, a second fuel quantity constituting the total quantity of fuel determined less the first fuel quantity;
   supplying, at a combustion air intake located on the first of the side walls of the melting chamber, into the melting chamber, the quantity of combustion air necessary for combustion of the total quantity of fuel determined, and combusting the first and second fuel quantities with the combustion air to produce combustion products, that circulate within the melting chamber past the second location, wherein the second location is located between the roof wall and a horizontal plane that is positioned at least as high as a horizontal plane passing through a lower edge of the combustion air intake; and
   mixing the second fuel quantity with the combustion products circulating in the melting chamber and thereafter combusting the second fuel quantity with the combustion air that is not consumed in the combustion of the first fuel quantity.

2. The process for melting glass according to claim 1, including supplying the second fuel quantity at the second location so that the second fuel quantity is not injected directly into the combustion air.

3. The process according to claim 1 including applying a rotary motion to the second quantity of fuel in introducing the second quantity of fuel into the melting chamber.

4. The process according to claim 1, wherein
the first quantity of fuel is a quantity of a first fuel and the second quantity of fuel is a quantity of a second fuel, and
the first fuel is different in composition from the second fuel.

5. A combustion process for melting glass while suppressing formation of nitrogen oxides in a furnace having a melting chamber with a plurality of side walls, a roof wall above the side walls, at least one burner located in a first of the side walls and through which fuel is introduced into the melting chamber, and at least one injector located in a second one of the side walls or in the roof wall and through which fuel is introduced into the melting chamber, the process comprising:
introducing into the melting chamber through the at least one burner a first quantity of fuel; introducing into the melting chamber through the first side wall an excess of combustion air needed for complete combustion of the first quantity of fuel;
introducing a second quantity of fuel into the melting chamber through the injector;
combusting the first and second quantities of fuel with the combustion air within the melting chamber and producing combustion products that circulate within the melting chamber past the injector so that the second quantity of fuel mixes with the combustion products circulating within the melting chamber; and
after the second quantity of fuel mixes with the combustion products circulating within the melting chamber, combusting the second quantity of fuel with the combustion air that is not consumed in the combustion of the first quantity of fuel.

6. The process according to claim 5 including applying a rotary motion to the second quantity of fuel in the injector in introducing the second quantity of fuel into the melting chamber.

7. The process according to claim 5, wherein
the first quantity of fuel is a quantity of a first fuel and the second quantity of fuel is a quantity of a second fuel, and
the first fuel is different in composition from the second fuel.

* * * * *